United States Patent [19]
Baba et al.

[11] Patent Number: 5,691,086
[45] Date of Patent: Nov. 25, 1997

[54] NICKEL ACTIVE MATERIAL FOR USE IN ALKALI STORAGE CELLS AND ITS MANUFACTURING METHOD

[75] Inventors: Yoshitaka Baba, Naruto; Motoo Tadokoro; Takeo Hamamatsu, both of Itano-gun; Akifumi Yamawaki, Naruto, all of Japan

[73] Assignee: Sanyo Electric Co., Ltd., Moriguchi, Japan

[21] Appl. No.: 598,598

[22] Filed: Feb. 12, 1996

[30] Foreign Application Priority Data

Feb. 14, 1995 [JP] Japan ................... 7-025476

[51] Int. Cl.⁶ ................................................. H01M 4/02
[52] U.S. Cl. ........................ 429/218; 429/224; 429/229
[58] Field of Search ........................... 423/594; 429/218, 429/223, 229, 224

[56] References Cited

U.S. PATENT DOCUMENTS

| | | | |
|---|---|---|---|
| 5,498,403 | 3/1996 | Shin | 423/592 |
| 5,506,076 | 4/1996 | Miyamoto et al. | 429/223 |
| 5,523,182 | 6/1996 | Ovshinsky et al. | 429/223 |

FOREIGN PATENT DOCUMENTS

| | | |
|---|---|---|
| 0 544 011 A1 | 6/1993 | European Pat. Off. |
| 0 575 093 A1 | 12/1993 | European Pat. Off. |
| 1-200555 | 8/1989 | Japan |
| WO-A-94 11910 | 5/1994 | WIPO |

OTHER PUBLICATIONS

Patent Abstracts of Japan, vol.13, No. 496 (E–843), Nov. 9, 1989 & JP–A–01 200555.

*Primary Examiner*—M. Nuzzolillo
*Attorney, Agent, or Firm*—Armstrong,Westerman, Hattori,McLeland Naughton

[57] ABSTRACT

A nickel active material for an alkali storage cell whose surface is covered with a cobalt compound, wherein the diffusion and permeation into the nickel hydroxide mother particles of cobalt compound during excessive discharging, which act to reduce the active material efficiency and the excessive discharging characteristics, are prevented. This is achieved by having a covering layer, including one or more of the following metal compounds; an aluminum compound, a magnesium compound, an indium compound and a zinc compound, in addition to a cobalt compound, formed on the surface of a mother particle of nickel hydroxide, and by heat treating the covered mother particles in the presence of alkali and oxygen so as to convert the cobalt compound into a compound of cobalt where an oxidization number of cobalt is greater than 2.

14 Claims, 1 Drawing Sheet

NICKEL ACTIVE MATERIAL FOR USE IN ALKALI STORAGE CELLS AND ITS MANUFACTURING METHOD

BACKGROUND OF THE INVENTION

1. Field of the Invention

The present invention relates to alkali storage cells, and more specifically to a nickel hydroxide active material for use in the positive electrode of an alkali storage cell.

2. Prior Art

Nickel hydroxide electrodes which include nickel hydroxide as an active material are widely used as the positive electrode in nickel-cadmium storage cells, nickel-hydrogen storage cells and other such alkali storage cells. Along with increasing demands for improved storage capacity due, for example, to the use of these kinds of alkali storage cells in portable electronic equipment, there have also been demands for improved energy density for nickel hydroxide electrodes.

One of the main conventional techniques for the formation of nickel hydroxide electrodes has been sintering wherein a multi-pore substrate, created by sintering powdered nickel into punching metal or the like, is impregnated with nickel hydroxide, although under said technique it is difficult to achieve a ratio of pores as high as 80% for such substrates. This places a limit on the amount of active material which can be impregnated into the substrate, making increases in the energy density of the electrode problematic. Such sintered electrodes also contain fine pores which are under 10 μm, which limits the possible pore-filling methods to solution impregnation methods and electrodeposition methods, both of which require complex processes.

There are, however, known techniques for producing non-sintered nickel hydroxide electrodes. Here, foam nickel which does not have a Central core is used as the substrate which is then directly filled using nickel hydroxide, this method having the advantages that a 95% ratio of pores can be achieved for the substrate and that there are improvements over sintering techniques in both energy density and the ease of the pore-filling process.

However, there is the problem that the radius of the pores in foam nickel substrates is large, resulting in a reduction in the contact area between the nickel substrate which is the current collecting plate and the active material particles with which the substrate is filled. This means that there is poor electrical contact between the active material and current collecting plate which causes a reduction in the overall efficiency of the active material in the positive electrode.

In order to overcome the above drawback with non-sintered foam nickel substrates, techniques for covering the surface of the nickel hydroxide mother particles with cobalt hydroxide or for covering the surface of the nickel hydroxide mother particles with a solid solution of nickel hydroxide and cobalt hydroxide have been proposed.

Once nickel positive electrode plates adapted to these techniques have been installed into alkali storage cells, the cobalt component dissolves in the electrolyte and is evenly dispersed on the surface of the nickel hydroxide, being precipitated during the first charging of the cell between the particles of active material connecting them and between the particles of active material and the current collecting plate connecting them also. This precipitate is cobalt oxyhydroxide which forms conductive networks which improve the electrical conductivity between the particles of active material and between the particles of active material and the current collecting plate. This in turn improves the efficiency of the active material particles.

Here, a technique for covering the surface of nickel hydroxide mother particles with cobalt hydroxide and then heat treating this covering layer in the presence of alkali solution is taught by Japanese Laid-Open Patent Application No. 1-200555, with an even greater improvement in conductivity being attained due to this process.

However, if a cell containing an active material where the surface of nickel hydroxide particles is covered in cobalthydroxide is subjected to excessive discharging, this will result in the cobalt hydroxide forming the covering layer being diffused and permeating into the nickel hydroxide mother particles. This causes a reduction in the amount of cobalt hydroxide on the surface of the mother particles, and a reduction in the electrical conductivity of the conductive networks formed inside the electrode. This causes a drop in the capacity of the electrode. There can be variation in the degree to which this phenomenon occurs, but it is a recognized problem for the technique covering the mother particle with a solid solution of nickel hydroxide and cobalt hydroxide, even when the mother particles are heat treated in the presence of alkali solution, so that a solution to this problem is desired.

SUMMARY OF THE INVENTION

It is a primary object of the present invention to provide a nickel active material and an alkali storage cell using said nickel active material, wherein the nickel active material is a nickel hydroxide active material with its surface covered in cobalt compound, which achieves a large improvement in conductivity using only a small amount of covering material and which does not suffer from the diffusion and permeation of the cobalt compound in the covering layer into the nickel hydroxide mother particles.

This object can be achieved by a nickel active material in particle form comprising a covering layer formed on a surface of one of a mother particle formed of nickel hydroxide and a mother particle formed with a main component of nickel hydroxide, wherein the covering layer includes a cobalt compound and at least one of the following metal compounds; an aluminum compound, a magnesium compound, an indium compound and a zinc compound, and the cobalt compound in the covering layer is converted into cobalt compound where an oxidization number of cobalt is higher than 2 by heat treatment of the nickel active material in the presence of oxygen and alkali.

This object can also be achieved by an alkali storage cell, comprising: a positive electrode made up of a substrate filled with a nickel active material in particle form comprised of a covering layer formed on a surface of one of a mother particle formed of nickel hydroxide and a mother particle formed with a main component of nickel hydroxide, wherein the covering layer includes a cobalt compound and at least one of the following metal compounds; an aluminum compound, a magnesium compound, an indium compound and a zinc compound, and wherein the cobalt compound in the covering layer is converted into cobalt compound where an oxidization number of cobalt is higher than 2 by heat treatment of the nickel active material in the presence of oxygen and alkali; a negative electrode arranged so as to face the positive electrode with a separator in-between; and an alkali electrolyte which is in contact with both the positive electrode and the negative electrode.

This object can also be achieved by a manufacturing method for nickel active material for an alkali storage cell, including: a dispersed solution adjustment step for adjusting a dispersed solution by dispersing one of mother particles formed of nickel hydroxide and mother particles formed with nickel hydroxide as a main component; a covering step for adding an alkali solution and a multiple component solution containing a cobalt compound and metal compound made up of at least one of an aluminum compound, a magnesium compound, an indium compound and a zinc compound to the dispersed solution whilst adjusting a weak base, thereby using the mother particles as a base and covering a surface of the mother particles by precipitating a multiple component precipitate made up of the cobalt compound and the metal compound; and an alkali heat treatment step for placing the mother particles covered in the covering step into alkali metal solution and heat treating with oxygen present.

Furthermore, this object can also be achieved by a manufacturing method for an alkali storage cell, comprising: a positive electrode manufacturing step which comprises: dispersed solution adjustment step for adjusting a dispersed solution by dispersing one of mother particles formed of nickel hydroxide and mother particles formed with a main component of nickel hydroxide; a covering step for adding an alkali solution and a multiple component solution containing a cobalt compound and metal compound made up of at least one of an aluminum compound, a magnesium compound, an indium compound and a zinc compound to the dispersed solution whilst adjusting a weak base, thereby using the mother particles as a base and covering a surface of the mother particles by precipitating a multiple component precipitate made up of the cobalt compound and the metal compound; and an alkali heat treatment step for placing the mother particles covered in the covering step into alkali metal solution and heat treating with oxygen present, and a cell assembly step for arranging the positive electrode formed in the positive electrode manufacturing step and a negative electrode so as to face each other with a separator in-between and for assembling a cell by pouring in an alkali electrolyte.

By means of the constructions of the invention, the surface of the mother particle which is composed of nickel hydroxide or which has nickel hydroxide as its main component is covered with cobalt compound where the oxidization number of cobalt exceeds 2. Since cobalt compounds where the oxidization number of cobalt exceeds 2 have excellent conductive characteristics, there is a clear improvement in the conductivity of the active material.

When this nickel hydroxide active material of superior conductive characteristics is used to fill a substrate, the cobalt compound in the covering layer forms favorable conductive networks between neighboring particles of the nickel hydroxide active material. As a result, a greater number of particles of the nickel hydroxide active material can contribute to the electrode reaction, leading to a great improvement in the efficiency of the active material.

Here, since the oxidization number of the cobalt in the cobalt compound in the covering layer on the mother particle is greater than 2, the conductivity of the active material can be improved using only a small amount of additive.

Also, the covering layer includes a metal compound made up of at least one of an aluminum compound, a magnesium compound, an indium compound and a zinc compound, so that the capacity of the nickel hydroxide active material, especially the capacity after excessive discharging (which is to say excessive discharging characteristics) is improved.

This is because if a metal compound made up of at least one of an aluminum compound, a magnesium compound, an indium compound and a zinc compound is added to the covering layer made up of cobalt compound, this metal compound is believed to act so as to suppress the diffusion and permeation of the cobalt compound into the inner part of the mother particles.

Here, it is desirable for the amount of cobalt compound in the covering layer to be within a range of 1% to 15% by weight of the nickel hydroxide mother particle calculating in terms of hydroxides.

In the same way it is desirable for the amount of the metal compound such as aluminum compound, magnesium compound, indium compound and zinc compound in the covering layer to be within a range of 0.5% to 25% by weight of the cobalt compound calculating in terms of hydroxides, with it also being desirable for said weight to be 3% or less of the weight of the nickel hydroxide in the mother particle calculating in terms of hydroxides.

By means of the manufacturing method of the invention, a multiple component precipitate formed of a cobalt compound and a metal compound made up of at least one of an aluminum compound, a magnesium compound, an indium compound and a zinc compound is formed on the surface of the mother particles during the covering step, thereby forming a covering layer on the surface of the mother particles.

Furthermore, since with these methods the composition and concentration of the multiple component solution can be adjusted and the pH, dispersion solution temperature, and strength of stirring can be changed for the solution into which the mother particles are dispersed (the dispersed solution), the composition of the covering layer, the thickness of the covering layer and condition of the covering layer can be adjusted, so that a desired covering layer can be easily produced with a higher yield rate.

In the alkali heat treatment step, the cobalt compound contained in the covering layer is converted into cobalt compound where the oxidization number of cobalt is greater than 2 and the microstructure of the covering layer is converted into a porous state which is favorable for the electrode reaction. In this way, the conductivity of the covering layer is improved and the microstructure of the covering layer is changed so that the contact between the electrolyte and the mother particle is improved.

Here, it is preferable for the concentration of the alkali metal solution in the alkali heat treatment to be 15% to 40% by weight and for the temperature during the heat treatment to be within a range of 50° C. to 150° C.

By means of these kinds of manufacturing methods, nickel hydroxide active material and alkali cells for which the efficiency of the active material, the capacity per unit weight of active material and the excessive discharging characteristics are superior can be reliably manufactured with a higher yield rate.

BRIEF DESCRIPTION OF THE DRAWINGS

These and other objects, advantages and features of the invention will become apparent from the following description taken in conjunction with the accompanying drawings which illustrate a specific embodiment of the invention. In the drawings.

DESCRIPTION OF THE PREFERRED EMBODIMENTS

Figure 1:
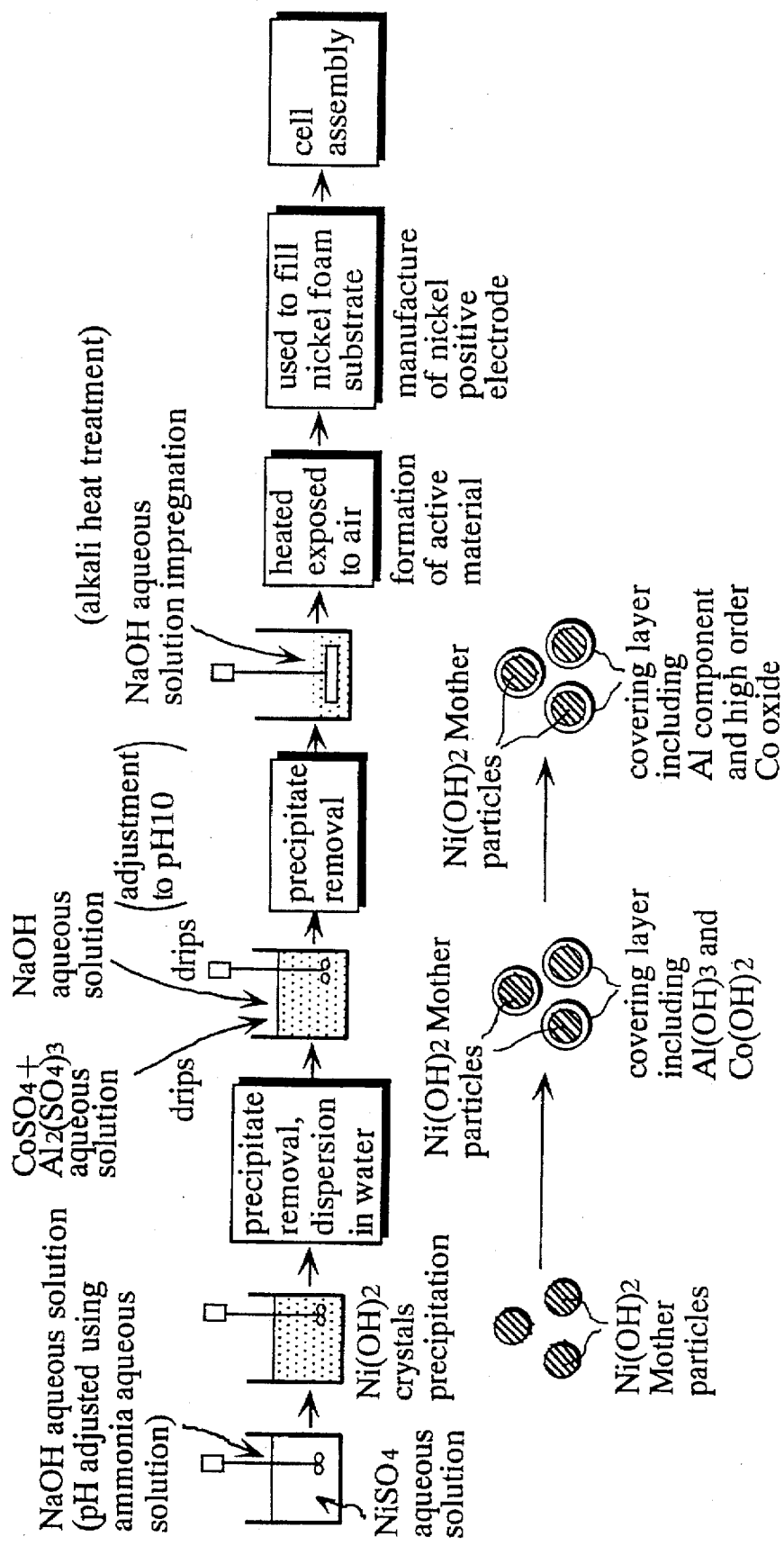
FIG. 1 is a drawing showing the manufacturing process of the nickel hydroxide active material and the alkali storage cell to which the embodiments of the present invention relate, said drawing also showing the state of the nickel hydroxide particles at each stage of the manufacturing process.

The following is a description of the embodiments of the present invention and comparative examples, as well as the results obtained from experiments using the embodiments of the present invention and the comparative examples.

First Embodiment

FIG. 1 is a drawing showing the manufacturing process of the nickel hydroxide active material and the alkali storage cell to which the present embodiment relates, said drawing also showing the state of the nickel hydroxide particles at each stage of the manufacturing process.

The following is an explanation of the manufacturing process of the nickel hydroxide active material and the alkali storage cell of the present embodiment and of the characteristics of said nickel hydroxide active material and alkali storage cell.

Manufacture of the Nickel Hydroxide Mother Particles and the Covering Layer

Firstly, an aqueous solution of 25% sodium hydroxide by weight was slowly mixed into an aqueous solution of nickel sulfate of specific gravity of around 1.33 so as to precipitate nickel hydroxide, with the pH being constantly adjusted using an aqueous solution of ammonia. This nickel hydroxide precipitate was then washed in water so that nickel hydroxide mother particles were produced. It should be noted here that the average particle radius of the nickel hydroxide mother particles was around 10 μm.

Following this, the aforementioned nickel hydroxide mother particles were mixed and dispersed in approximately four times the amount of water (relatively by weight) and, while keeping the pH of this mixture (slurry) constant at 10 using sodium hydroxide solution, drops of solutions including a cobalt compound and an aluminum compound were added. In this embodiment, the multiple component solution is made up of a fixed amount of aluminum sulfate mixed into an aqueous solution of cobalt sulfate whose concentration is 10% by weight when calculated in terms of the weight of the metal (cobalt).

By doing so, a multiple component precipitate was precipitated on the surface of the mother particles so as to cover the mother particles with a multiple component layer. These particles were then removed, washed and dried.

These particles of nickel hydroxide whose surface is covered are called covered nickel particles. The covering layer of these covered nickel particles is made up of a solid solution of cobalt hydroxide and aluminum hydroxide, with it being possible to adjust the covering amount of cobalt hydroxide by changing the amount of drops mixed into the multiple component solution relative to the mother particles. That is to say, the relative amount of the dripped substances and the cobalt hydroxide in the multiple component solution can be found beforehand by experimentation, so that a desired covering amount can be attained by adjusting the amount of the dripped substances in the multiple component solution.

In the present embodiment, the amount of cobalt hydroxide in the covering layer was set so as to be 10% by weight of the nickel hydroxide in the mother particle when calculating in terms of hydroxide amount.

Also, by adjusting the amount of aluminum sulfate added to the aqueous solution of cobalt sulfate when adjusting the multiple component solution, the amount of aluminum hydroxide included in the covering layer can be adjusted relative to the amount of cobalt hydroxide.

In the present embodiment, the amount of aluminum sulfate added to the multiple component solution was set so that aluminum hydroxide included in the covering layer is 5% by weight of hydroxide relative to the amount of cobalt hydroxide.

The amounts of the nickel hydroxide, cobalt hydroxide and aluminum hydroxide in the covered nickel particles were measured according to the following method.

The covered nickel particles were dissolved in diluted hydrochloric acid and the ratio between the nickel, cobalt and aluminum was measured using an ICP quantimeter. After this, the percentage by weight of nickel hydroxide, cobalt hydroxide and aluminum hydroxide were calculated based on the measured ratio between the nickel, cobalt and aluminum.

It should be noted that although aluminum sulfate was used here as an additive into the aqueous solution of cobalt sulfate to form the multiple component solution, the same results can be achieved by adding aluminum nitrate to cobalt sulfate, by adding aluminum chloride to cobalt chloride or by other such combinations.

Alkali Heat Treatment

While stirring the covered nickel particles in a beaker, enough of an alkali metal solution (an aqueous solution of 25% by weight of sodium hydroxide) to dampen the particles was added so as to impregnate the covered nickel particles, before the particles were heat treated for 0.5 hours at 80° C. while stirring in the presence of oxygen. This process is called alkali heat treatment.

This alkali heat treatment converts the cobalt compound in the covering layer into a compound of cobalt where the oxidization number of cobalt is greater than 2. That is to say, much of the cobalt hydroxide in the covering layer (the oxidization number of cobalt being 2) is converted during the alkali heat treatment into cobalt oxide where the oxidization number of cobalt is 3, so that the average oxidization number of the cobalt becomes greater than 2.

The microstructure of the covering layer is also converted into a porous structure as is described later in this text, which improves the excessive charging characteristics of the cell and the contact between the mother particles and the electrolyte.

It should be clear here that the aluminum compound is still present in the covering layer after the alkali heat treatment has been performed.

The active material manufactured in this way is set as the active material $A_1$.

Manufacture of the Nickel Electrode 100 parts by weight of the active material $A_1$ and 50 parts by weight of an aqueous solution of hydroxypropyl cellulose (0.2% by weight) were mixed so as to produce an active material slurry, with this active material slurry being used to fill foam nickel of thickness 1.6 mm and of a 5% degree of porousness, before this was dried and rolled so as to produce an electrode which is 0.6 mm thick and which has a nominal capacity of 1200 mAh.

It should be noted here that the amount of the filled active material is viewed in terms of only the nickel hydroxide in the active material $A_1$, and is calculated based on a theoretical capacity (289 mAh/g) per unit weight of nickel hydroxide.

Manufacture of the Negative Electrode

Misch metal (Mm), nickel, cobalt, aluminum and manganese were mixed at a ratio of 1.0:3.6:0.6:0.2:0.6, with this mixture then being melted to form an alloy under argon gas in a harmonic induction furnace. This molten alloy was then cooled so as to produce an ingot expressed by the formation equation $Mm_{1.0}Ni_{3.6}Co_{0.6}Al_{0.2}Mn_{0.6}$. This ingot is then pounded to form a hydrogen absorbing alloy whose average particle radius is 100 μm.

This hydrogen absorbing alloy was then mixed with a binding agent such as polyethylene oxide and an appropriate amount of water to form a hydrogen absorbing alloy paste which was spread on both sides of punching metal, dried, and then rolled to a thickness of 0.4 mm to form the negative electrode.

Assembly of the alkali storage cell

The nickel electrode described above was used as the positive electrode, with the positive electrode and negative electrode being used as layers with a separator in-between. The set of electrodes was then inserted into a cylindrical outer casing into which a fixed amount of alkali electrolyte was poured. The cylindrical nickel-hydrogen storage cell was then completed by sealing the outer casing.

It should be noted here that the theoretical capacity (1200 mAh) of the cell is set by the positive electrode with the capacity of the negative electrode being set at 1.5 times that figure.

The cell constructed as described above is called cell $A_1$.

Second Embodiment

During the manufacturing process of the active material $A_1$ in the first embodiment, one of magnesium sulfate, indium sulfate and zinc sulfate was used in place of aluminum sulfate as the metal salt added to the aqueous solution of cobalt sulfate in manufacturing the multiple component solution. In this way, the active materials $A_2$, $A_3$ and $A_4$ were produced.

Here, the covering layer of the manufactured active material $A_2$ is formed of high-order converted cobalt along with a magnesium compound, the covering layer of the manufactured active material $A_3$ is formed of high-order converted cobalt along with an indium compound and the covering layer of the manufactured active material $A_4$ is formed of high-order converted cobalt along with a zinc compound.

As before, cells $A_2$, $A_3$ and $A_4$ were manufactured according to the same method as the cell in the first embodiment using the active materials $A_2$, $A_3$ and $A_4$.

It should be noted here that while in the present embodiment, magnesium sulfate, indium sulfate and zinc sulfate were added to the aqueous solution of cobalt sulfate in manufacturing the multiple component solution, other salts such as any of magnesium nitrate, indium nitrate and zinc nitrate can similarly be added to cobalt nitrate to achieve the same results.

COMPARATIVE EXAMPLE 1

During the manufacturing process of the active material $A_1$ of the first embodiment, in place of the dripping of the multiple component solution, dripping of an aqueous solution of cobalt sulfate (of concentration 10% by weight in terms of the weight of the metal) was performed, with other than that the same method as the first embodiment being used to produce the active material X.

The active material X has the cobalt compounds in the covering layer converted into higher-order cobalt but does not include a compound of a metal such as aluminum.

Using the same method as the cell in the first embodiment, a cell X including active material X was manufactured.

COMPARATIVE EXAMPLE 2

Here, active materials $Y_0$, $Y_1$, $Y_2$, $Y_3$ and $Y_4$ were manufactured using the same processes as active materials X and $A_1$, $A_2$, $A_3$ and $A_4$ of comparative example 1 and the first and second embodiments with the exception that the alkali heat treatment was not performed.

Since these active materials $Y_0$, $Y_1$, $Y_2$, $Y_3$ and $Y_4$ were not subjected to alkali heat treatment, the cobalt compound in the covering layer is not converted into higher-order cobalt and the conversion of the microstructure of the covering layer does not occur.

Using the same method as the cell in the first embodiment, cells $Y_0$, $Y_1$, $Y_2$, $Y_3$ and $Y_4$ including these active materials $Y_0$, $Y_1$, $Y_2$, $Y_3$ and $Y_4$ were manufactured.

The composition and conditions of manufacturing the covering layer of the active materials in the first and second embodiments and comparative examples 1 and 2 are set out in Table 1.

TABLE 1

| Nickel active material type | Composition of covered nickel active material particle and conditions for manufacture | | | | | | Alkali heat treatment conditions | |
|---|---|---|---|---|---|---|---|---|
| | covering layer composition* | | | | | pH of solvent during covering | Concentration of alkali metal solution | temp during treatment |
| | Co | Al | Mg | In | Zn | | | |
| $Y_0$ | 10 | — | — | — | — | 10 | | |
| $Y_1$ | 10 | 0.5 | — | — | — | 10 | | |
| $Y_2$ | 10 | — | 0.5 | — | — | 10 | | |
| $Y_3$ | 10 | — | — | 0.5 | — | 10 | | |
| $Y_4$ | 10 | — | — | — | 0.5 | 10 | | |
| X | 10 | — | — | — | — | 10 | 25 | 80 |
| $A_1$ | 10 | 0.5 | — | — | — | 10 | 25 | 80 |
| $A_2$ | 10 | — | 0.5 | — | — | 10 | 25 | 80 |
| $A_3$ | 10 | — | — | 0.5 | — | 10 | 25 | 80 |
| $A_4$ | 10 | — | — | — | 0.5 | 10 | 25 | 80 |

*displayed as a percentage by weight of the mother particle

Experiments

The following experiments were carried out for the active materials in the first and second embodiments and comparative examples 1 and 2.

Experiment 1

The capacity per unit weight of active material and excess charging characteristics were measured.

Here, the capacity per unit weight of active material and excessive discharging characteristics were measured for the cells $A_1$–$A_4$, X and $Y_0$–$Y_4$.

The electrical capacity per unit weight of the active material was calculated according to the following mathematical equation, with the discharging capacity being measured by having the aforementioned cells continuously charged for 16 hours using a current of 120 mA before discharging the cells with a current of 240 mA until the cell voltage falls to 1.0V.

$$\text{electrical capacity per unit weight of active material} = \left[\frac{\text{cell discharge capacity}}{\text{Ni active material amount in Ni electrode}}\right] * 100$$

The excessive discharging characteristics were also evaluated for the aforementioned cells under the conditions described below.

1. When charging at 1200 mA, the charging was stopped for one hour when the cell voltage dropped 10 mV ($-\Delta V$) after the maximum voltage had been attained.

2. After stopping for one hour, the cell was discharged at a current of 1200 mA until the discharge ending voltage of 1.0V was reached.

3. After the above discharging, the cell was forcibly discharged at a current of 60 mA for sixteen hours.

4. After repeating 1.–3. for ten cycles, the process 1. to 2. was repeated for five cycles. The discharge capacity before excess discharging and the discharge capacity after the final cycle were completed were measured, with the ratio between the two forming the excessive discharging characteristics.

The results of Experiment 1 are shown in Table 2.

TABLE 2

| Active material type | Capacity per unit weight of active material (index number) | Excess discharging characteristics (index number) |
| --- | --- | --- |
| $Y_0$ | 100 (standard) | 100 (standard) |
| $Y_1$ | 102 | 121 |
| $Y_2$ | 103 | 120 |
| $Y_3$ | 103 | 119 |
| $Y_4$ | 103 | 121 |
| X | 104 | 113 |
| $A_1$ | 105 | 133 |
| $A_2$ | 104 | 133 |
| $A_3$ | 104 | 132 |
| $A_4$ | 105 | 135 |

Note here that the values in Table 2 are expressed as index numbers with cell $Y_0$ as the standard so that its cell capacity and excessive discharge characteristics are set at 100.

As can be seen from the results in Table 2, the capacity per unit weight of active material and the excessive discharging characteristics of cells $Y_1$–$Y_4$ are superior when compared to cell $Y_0$, with cells $A_1$–$A_4$ also being superior when compared to cell X. The improvement here in excessive discharging characteristics is especially noticeable.

This is to say the excessive discharging characteristics of active material are improved by adding a compound of any of aluminum, magnesium, indium and zinc to the covering layer made up of a cobalt compound (hereinafter, this effect is known as the multiple component effect).

Also, by comparing cell X and cells $A_1$–$A_4$ to cells $Y_0$–$Y_4$, it can be seen that the former have superior capacity per unit weight of active material and excessive discharge characteristics, showing that the alkali heat treatment leads to an improvement in capacity per unit weight of active material and in excessive discharge characteristics.

Accordingly, it can be understood that improvements in capacity per unit weight of active material and in excessive discharge characteristics can be made by forming the covering layer of a multiple component precipitate including a cobalt compound and an aluminum compound or the like.

The multiple component effect and the effect of alkali heat treatment can be considered as follows.

When a covering layer of a cobalt compound is formed on the surface of the nickel hydroxide mother particle, the covering layer acts to improve the conductivity of the active material particle and to form conductive networks between active material particles. Accordingly, the efficiency of the active material is improved. However, if the covering layer is formed of only a cobalt compound, this cobalt compound is diffused and permeates into the nickel hydroxide mother particle during excessive discharging, leading to a reduction in the amount of the cobalt compound on the surface of the particle, reducing the conductivity between the particles of active material after excessive discharging.

It can also be considered that the further improvement in excessive discharging characteristics due to alkali heat treatment is due to the production of a higher-order cobalt compound of an oxidization number higher than 2 which is a superior conductor, and due to the conversion to a porous structure of the microstructure of the multiple component precipitate covering layer, so that the electrical contact between the mother particles and the electrolyte is improved.

This is to say, the alkali heat treatment can be considered as having both a chemical and a physical effect on the covering layer so that the covering layer is converted into a more favorable state for the electrode reaction.

It should be noted here that the metal compounds such as the aluminum compound, magnesium compound, indium compound and zinc compound have superior properties for electrode additives in that they can be easily formed into a multiple component precipitate with the cobalt compound and in that they do not affect the cell reaction.

Experiment 2

The relationship between amount of covering layer and the efficiency of the active material was investigated.

Using the same manufacturing method as active material $A_4$ in the second embodiment, active materials $B_1$–$B_8$ were produced with the difference with active material $A_4$ being that the amount of cobalt compound measured in terms of the nickel hydroxide in the mother particle was varied between 0.5% to 16% by weight of hydroxides, with the efficiency of the active material then being measured for these active materials $B_1$–$B_8$. It should be noted here that the covering layer of these active materials $B_1$–$B_8$ was formed of a two component precipitate of a cobalt compound and a zinc compound at a fixed ratio of 10:0.5.

The efficiency of the active material was measured according to the following method. A simple open cell made up of a nickel electrode of theoretical capacity 360 mAh using one the active materials $B_1$–$B_8$, a nickel plate as an opposing electrode and an aqueous solution of 25% potassium hydroxide by weight was manufactured. It should be noted here that the amount of active material used to fill the nickel electrode was regarded here as consisting of only the nickel hydroxide component and was calculated using the theoretical capacity of (289 mAh/g) per unit weight of the nickel hydroxide.

First, the efficiency of the active material was calculated according to the equation below, with the discharging capacity being measured by having the simple cell described above continuously charged for 24 hours using a current of 36 mA before discharging the cell with a current of 120 mA until the ending discharge voltage of −0.8V was reached at the nickel plate.

$$\text{efficiency of active material during operation} = \left[ \frac{\text{simple cell discharge capacity}}{\text{simple cell theoretical capacity}} \right] * 100$$

The results of these experiments are shown in Table 3, with the amount of the cobalt covering layer being expressed as the percentage by weight of the cobalt compound relative to the nickel hydroxide calculated in terms of the weight of hydroxides.

TABLE 3

| Nickel active material type | Operational efficiency of active material [index number] | Co % in terms of weight of Ni hydroxide |
| --- | --- | --- |
| $B_1$ | 92 | 0.5 |
| $B_2$ | 97 | 1 |
| $B_3$ | 98 | 3 |
| $B_4$ | 100 | 7.5 |
| $B_5$ | 100 (standard) | 10 |
| $B_6$ | 98 | 12.5 |
| $B_7$ | 98 | 15 |
| $B_8$ | 90 | 16 |

It should be noted here that the efficiency of the active materials shown in Table 3 are expressed as index numbers with the efficiency of the active material $B_5$ being set at 100 as the standard.

As can be clearly seen from Table 3, there is a large drop in the efficiency of the active material when the percentage by weight of cobalt is below 1% or above 15%.

This can be considered as being caused by an insufficiency of the cobalt compound when the percentage by weight is below 1%, so that favorable conductive networks cannot be formed. On the other hand, when the percentage by weight is above 15%, the minus effect due to the relative decrease of the nickel hydroxide included in the active material which leads to a reduction in energy density can be considered as being more significant than the effect of the improvement in conductivity.

From these results, it can be seen that it is desirable to have the amount of cobalt compound on the surface of the mother particles fall within a range of 1%–15% of the weight of the mother particle.

Experiment 3

In Experiment 3, the relationship between the proportionate amount of zinc compound to the cobalt compound and the excessive discharging characteristics was investigated.

Using the same manufacturing method as active material $A_4$ in the second embodiment, active materials $C_1$–$C_7$ where the proportionate amount of zinc compound to cobalt compound in the covering is varied between 0.3% and 30% in terms of weight of the hydroxide were produced, with all other processes being the same as for active material $A_4$. Using the same methods as Experiment 1, the capacity per unit active material and excessive discharging characteristics were measured for each active material $C_1$–$C_7$.

It should be noted here that for the covering layers of active materials $C_1$–$C_7$, the proportion of the cobalt compound to the nickel hydroxide was fixed at 10% by weight calculated in terms of hydroxides.

In Table 4, the capacity per unit active material and excessive discharging characteristics are expressed as index numbers with the capacity per unit active material and excessive discharging characteristics of active material $C_3$ being set at 100 as the standard.

TABLE 4

| Active material type | electrical capacity per unit weight of the active material [index no.] | excessive discharging characteristics [index no.] | Co:Zn = 1:X X is varied |
| --- | --- | --- | --- |
| $C_1$ | 101 | 88 | 0.3 |
| $C_2$ | 100 | 98 | 0.5 |
| $C_3$ | 100 (standard) | 100 (standard) | 5 |
| $C_4$ | 99 | 100 | 10 |
| $C_5$ | 99 | 99 | 15 |
| $C_6$ | 98 | 100 | 25 |
| $C_7$ | 92 | 100 | 30 |

As can be clearly seen from Table 4, there is a sudden drop in excessive discharging characteristics once the proportion of the zinc compound in terms of the cobalt compound is below 0.5% by weight. This as can be considered as being caused by the decrease in the proportion of the zinc compound preventing sufficient realization of the multiple component effect, so that as a result the cobalt compound is diffused and permeates into the nickel hydroxide mother particles.

On the other hand, once the proportion of the zinc compound in terms of the cobalt compound is above 25% by weight, there is a drop in the electrical capacity per unit weight of the active material. This can be considered as being caused by the decrease in the capacity per unit active material of the density of the cobalt compound on the surface of the active material which results from the increase in the amount of zinc compound.

It should be noted here that the tendencies exhibited by the results in Table 4 were repeated when an aluminum compound, a magnesium compound or an indium compound were substituted for the zinc compound in the multiple component precipitate.

From the above results, it can be seen that in the covering layer, it is desirable to have the ratio of one of the aluminum compound, the magnesium compound, the indium compound and the zinc compound to a cobalt compound fall within a range of 0.5% by weight to 25% by weight.

Experiment 4

In Experiment 4, the relationship between the proportion of zinc compound to cobalt compound and the operational efficiency of the active material was measured.

The same manufacturing method as $B_7$ was used to produce active materials $D_1$–$D_4$ wherein the amount of cobalt compound in the covering layer is fixed at 15% by weight of the mother particle and the amount of zinc compound is varied and between 2% and 3.5% of the weight of the nickel hydroxide.

The results of this experiment into the relationship between the proportion of the zinc compound to the nickel hydroxide (calculated in terms of hydroxides) and the efficiency of the active material are shown in Table 5.

TABLE 5

| Active material | composition in terms of nickel hydroxide | | operational active material [index no.] |
| --- | --- | --- | --- |
| | Co | Zn | |
| $D_1$ | 15 | 2 | 100 (standard) |
| $D_2$ | 15 | 2.5 | 100 |
| $D_3$ | 15 | 3 | 99 |
| $D_4$ | 15 | 3.5 | 96 |

In Table 5, the efficiency of the active material is expressed as an index number with the efficiency of the active material $D_1$ being set at 100 as the standard.

As can be seen from Table 5, there is a noticeable drop in the operational efficiency of the active material once the amount of zinc compound exceeds 3% by weight of the nickel hydroxide mother particle compared to when the amount of the zinc compound is in the range of 2%–3% by weight. This can be thought to be due to the minus effect of the decrease in the amount of nickel hydroxide once the amount of zinc compound exceeds 3% by weight.

From the above results and the results of Experiment 3, it can be seen that while it is desirable that the proportion of the zinc compound in the covering layer to the cobalt compound is between 0.5% to 25% by weight, when there is a relatively high proportion by weight of the cobalt compound to the nickel hydroxide, it is desirable that the amount of zinc compound in the covering be 3% by weight or below of the nickel hydroxide mother particle calculated in terms of hydroxides.

Experiment 5

In Experiment 5, the relationship of the operational efficiency of the active material and the pH of the solution during covering was investigated.

Using the same manufacturing method as active material $A_4$ in the second embodiment, active materials $E_1$–$E_6$ were produced varying the pH of the solution during the formation of the covering layer within a range of 6.5 to 13 and the capacity per unit active material was measured in the same way as in Experiment 1.

The results of this experiment into the relation between the capacity per unit active material and the pH of the solution are shown in Table 6.

TABLE 6

| Active material | capacity per unit of active material | pH of solution during covering |
| --- | --- | --- |
| $E_1$ | 81 | 6.5 |
| $E_2$ | 94 | 7.5 |
| $E_3$ | 95 | 9.5 |
| $E_4$ | 100 (standard) | 10 |
| $E_5$ | 94 | 12.5 |
| $E_6$ | 80 | 13 |

In Table 6, the capacity per unit active material is expressed as an index number with the capacity per unit active material of active material $E_4$ being set at 100 as the standard.

As can be clearly seen from Table 6, there is favorable capacity per unit active material when the pH of the solution during the formation of the covering layer is between 7.5 and 12.5, while when the pH of the solution is below 7.5 or above 12.5, there is a large drop in capacity per unit active material.

When precipitation of the covering layer is performed within a pH range of 7.5 to 12.5, the precipitation of the cobalt compound and zinc compound near the surface of the mother particles proceeds gradually and continuously, so that an even and precise covering layer can be formed. On the other hand, it is difficult for favorable precipitation to occur when the pH of the solution is below 7.5 or above 12.5. In particular, when the pH of the solution is above 12.5, the precipitation of the two-component precipitate becomes rapid and a covering layer cannot be properly formed.

Experiment 6

In Experiment 6, the relationship between the concentration of the alkali metal solution in the alkali heat treatment and the operational efficiency of the active materials was found.

Using the same manufacturing method as the active material $A_4$, active materials $F_1$–$F_6$ were manufactured varying the concentration of the aqueous sodium hydroxide solution used in the alkali heat treatment between 12%–45%. The efficiency of the active materials $F_1$–$F_6$ was then measured in the same way as in Experiment 2.

Table 7 shows the results of this experiment in which the relationship between the concentration of the aqueous sodium hydroxide solution and the efficiency of the active materials was investigated.

TABLE 7

| Active material | operational efficiency of active material [index number] | concentration of alkali metal solution (wt %) |
| --- | --- | --- |
| $F_1$ | 89 | 12 |
| $F_2$ | 96 | 15 |
| $F_3$ | 100 (standard) | 25 |
| $F_4$ | 100 | 35 |
| $F_5$ | 98 | 40 |
| $F_6$ | 91 | 45 |

NB: Temperature during heat treatment: 80° C.

As can be clearly seen from Table 7, the efficiency of the active materials is favorable when the concentration of the sodium hydroxide solution is 15% to 40% by weight, while when the concentration is below 15% by weight or above 40% by weight, there is a noticeable drop in the efficiency.

This can be considered as being caused by the factors described below.

When alkali heat treatment is performed using sodium hydroxide solution whose concentration is 15% to 40% by weight, the cobalt compound on the surface of the particles is evenly converted into cobalt compounds where the oxidization number of cobalt is above 2 (high-order cobalt compounds) which increases the conductivity of the covering layer. In this way, conducting networks are formed between the particles of active materials which increases the overall efficiency.

On the other hand, if the concentration of the alkali metal solution is below 15% by weight, the solubility of the cobalt hydroxide in the alkali solution is reduced, resulting in problems in the reaction converting the cobalt hydroxide into higher order compounds. This can be considered as the reason why there is insufficient improvement in efficiency.

Also, if the concentration of the alkali metal solution is above 40% by weight, it is thought that the increased viscosity of the solution prevents the alkali from permeating the covering layer, leading to unevenness in the reaction converting the cobalt hydroxide into higher order compounds.

It should be noted here that it was checked that the same results were achieved by using other alkali compounds, such as potassium hydroxide, in place of sodium hydroxide.

Experiment 7

In Experiment 7, the relationship between the temperature during the alkali heat treatment and the efficiency of the active materials was investigated.

Active materials $G_1$–$G_7$ were manufactured using the same manufacturing method as active material $A_4$ in the second embodiment, with the exception that the temperature during the alkali heat treatment was varied between 40° C. and 160° C., with the efficiency of the active material in these active materials $G_1$–$G_7$ then being measured in the same way as in Experiment 2.

The results are shown in Table 8.

TABLE 8

| Nickel active material type | operational efficiency of active material [index number] | temperature in alkali heat treatment (°C.) |
|---|---|---|
| $G_1$ | 81 | 40 |
| $G_2$ | 95 | 50 |
| $G_3$ | 99 | 70 |
| $G_4$ | 100 (standard) | 80 |
| $G_5$ | 99 | 120 |
| $G_6$ | 95 | 150 |
| $G_7$ | 71 | 160 |

NB: Concentration of sodium hydroxide in aqueous solution: 25%

As can be clearly seen from Table 8, a range of heat treatment temperature between 50° C. and 150° C. is favorable for the efficiency of the active material, with there being a severe drop in efficiency below 50° C. and above 150° C.

The desirable range for the heating temperature during the alkali heat treatment being 50° C. to 150° C. can be considered as being due to this range allowing the smooth conversion of cobalt to a higher order and also due to the destruction of the microstructure of the covering layer composed of the multiple component precipitate during heat treatment and the formation of a covering layer with suitably-sized pores as the higher order cobalt compounds are generated. If the covering layer has suitably-sized pores, the covering layer does not hinder the contact between the electrolyte and the mother particle so that the electrochemical reaction can proceed smoothly.

On the other hand, if the temperature during heat treatment is below 50° C., this will result in a decrease in the solubility of the cobalt hydroxide in the alkali solution as well as a reduction in the effect of the heat treatment on the covering layer. If the temperature is above 150° C., it can be considered that the heat treatment has a detrimental effect on the nickel hydroxide forming the mother particle, so that the mother particle is converted into nickel oxide which is not an active material for an electrolytic cell.

It should be noted here that the above embodiments have described a covering layer of a cobalt compound which contains one of an aluminum compound, a magnesium compound, an indium compound or a zinc compound, although the same results may be achieved if two or more of such compounds are used.

Similarly, the above embodiments describe examples of foam nickel filled with active materials as the substrates of nickel electrodes, although the same results can be achieved by filling a substrate, such as punching metal, with active material in the same way as is described above.

For the nickel hydroxide active materials of the present invention, the cobalt hydroxide in the covering layer is converted by means of alkali heat treatment into cobalt compounds where the oxidization number of cobalt exceeds 2, which acts to increase the conductivity of the active material. Further adding one or more of the following metal compounds; an aluminum compound, a magnesium compound, an indium compound and a zinc compound, also acts to suppress the diffusion and permeation of the cobalt compound into the nickel hydroxide mother particles during excessive discharging.

Therefore, when this kind of nickel hydroxide active material is used to fill an electrode substrate which is then installed into an alkali storage cell, favorable conductive networks will be formed between the active material particles, leading to a large increase in the efficiency of the electrode active materials and an increase in the electrical capacity per unit weight of active material (energy density), as well as preventing any reduction in electrical capacity after excessive discharging.

Furthermore, the manufacturing method of the present invention enables the safe and reliable manufacture of the above nickel active material and alkali storage cell by means of a relatively simple method.

Accordingly, this method can provide nickel active material of high electrical capacity per unit weight and of superior excessive discharging characteristics at low cost.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A nickel active material in particle form comprising a covering layer formed on a surface of a mother particle comprising nickel hydroxide, wherein
    the covering layer includes a cobalt compound and at least one of the following metal compounds; an aluminum compound, a magnesium compound, an indium compound and a zinc compound, and the cobalt compound in the covering layer is converted into cobalt compound where an oxidization number of cobalt is higher than 2 by heat treatment of the nickel active material in the presence of oxygen and alkali.

2. The nickel active material of claim 1, wherein the covering layer includes an amount of cobalt compound which is between 1% and 15% by weight of nickel hydroxide in the mother particle calculated in terms of hydroxides.

3. The nickel active material of claim 2, wherein the amount of metal compound in the covering layer is between 0.5% and 25% of the weight of the cobalt compound calculated in terms of hydroxides.

4. The nickel active material of claim 3, wherein the amount of metal compound in the covering layer is below 3% of the weight of the mother particle calculated in terms of hydroxides.

5. The nickel active material of claim 1, wherein the amount of metal compound in the covering layer is between 0.5% and 25% of the weight of the cobalt compound calculated in terms of hydroxides.

6. The nickel active material of claim 5, wherein the amount of metal compound in the covering layer is below 3% of the weight of the mother particle calculated in terms of hydroxides.

7. An alkali storage cell, comprising:
    a positive electrode made up of a substrate filled with a nickel active material in particle form comprises of a covering layer formed on a surface of a mother particle comprising nickel hydroxide, wherein the covering layer includes a cobalt compound and at least one of the following metal compounds; an aluminum compound, a magnesium compound, an indium compound and a zinc compound, and wherein the cobalt compound in the covering layer is converted into cobalt compound where an oxidization number of cobalt is higher than 2 by heat treatment of the nickel active material in the presence of oxygen and alkali;

a negative electrode arranged so as to face the positive electrode with a separator in-between; and an alkali electrolyte which is in contact with both the positive electrode and the negative electrode.

8. A manufacturing method for nickel active material for an alkali storage cell, including:

dispersing mother particles comprising nickel hydroxide to form a dispersed solution;

adding an alkali solution and a multiple component solution containing a cobalt compound and metal compound made up of at least one of an aluminum compound, a magnesium compound, an indium compound and a zinc compound to the dispersed solution whilst adjusting pH with a weak base, thereby using the mother particles as a base and covering a surface of the mother particles by precipitating a multiple component precipitate made up of the cobalt compound and the metal compound; and placing the mother particles covered in the covering step into alkali metal solution and heat treating with oxygen present.

9. The manufacturing method of claim 8, wherein the pH of the dispersed solution in the covering process is adjusted so as to be in a range of 7.5 to 12.5 for the precipitation of the multiple component precipitate on the surface of the mother particles.

10. The manufacturing method of claim 8, wherein the amount of cobalt compound in the covering step relative to the mother particle is within a range of 1% to 15% by weight, calculated in terms of hydroxides.

11. The manufacturing method of claim 8, wherein the concentration of the alkali metal in the alkali heat treatment step is in a range of 15% to 40% by weight.

12. The manufacturing method of claim 11, wherein the temperature during the alkali heat treatment process is between 50° C. and 150° C.

13. The manufacturing method of claim 8, wherein the temperature during the alkali heat treatment process is between 50° C. and 150° C.

14. A manufacturing method for an alkali storage cell, comprising:

a positive electrode manufacturing step which comprises:

dispersing mother particles comprising nickel hydroxide to form a dispersed solution;

adding an alkali solution and a multiple component solution containing a cobalt compound and metal compound made up of at least one of an aluminum compound, a magnesium compound, an indium compound and a zinc compound to the dispersed solution whilst adjusting pH with a weak base, thereby using the mother particles as a base and covering a surface of the mother particles by precipitating a multiple component precipitate made up of the cobalt compound and the metal compound; and placing the mother particles covered in the covering step into alkali metal solution and heat treating with oxygen present, arranging the positive electrode formed in the positive electrode manufacturing step and a negative electrode so as to face each other with a separator in-between and assembling a cell by pouring in an alkali electrolyte.

* * * * *